(12) United States Patent
Kopejtko

(10) Patent No.: US 12,518,898 B2
(45) Date of Patent: Jan. 6, 2026

(54) CURRENT CONTROLLING ELEMENT BASED ON SATURATION OF A MAGNETIC CIRCUIT

(71) Applicant: Eaton Intelligent Power Limited, Dublin (IE)

(72) Inventor: Petr Kopejtko, Prague (CZ)

(73) Assignee: Eaton Intelligent Power Limited, Dublin (IE)

( * ) Notice: Subject to any disclaimer, the term of this patent is extended or adjusted under 35 U.S.C. 154(b) by 1093 days.

(21) Appl. No.: 17/409,890

(22) Filed: Aug. 24, 2021

(65) Prior Publication Data

US 2022/0068527 A1 Mar. 3, 2022

(30) Foreign Application Priority Data

Aug. 28, 2020 (GB) ..................................... 2013521

(51) Int. Cl.
| | |
|---|---|
| *H01F 27/28* | (2006.01) |
| *G01R 15/18* | (2006.01) |
| *H01F 3/14* | (2006.01) |
| *H01F 27/255* | (2006.01) |

(52) U.S. Cl.
CPC .............. *H01F 3/14* (2013.01); *G01R 15/185* (2013.01); *H01F 27/255* (2013.01)

(58) Field of Classification Search
CPC ....... H01F 3/14; H01F 27/255; G01R 15/185; H03K 17/90; H03K 17/80; H03K 17/9515; H01H 50/16; H01H 50/163; H01H 50/44; H01C 10/103; H10N 50/10

USPC .......................................... 336/212, 221, 83
See application file for complete search history.

(56) References Cited

U.S. PATENT DOCUMENTS

| | | | |
|---|---|---|---|
| 5,461,308 A | 10/1995 | Jin et al. | |
| 5,564,194 A | 10/1996 | Fujita et al. | |
| 5,889,373 A * | 3/1999 | Fisher | H05B 41/2827 315/307 |
| 6,710,587 B1 * | 3/2004 | Reynoso | G01R 15/205 324/754.29 |
| 2004/0032315 A1 | 2/2004 | Illingworth | |
| 2006/0066292 A1 * | 3/2006 | Tadatsu | G01R 15/185 324/117 H |
| 2012/0062215 A1 * | 3/2012 | Ide | G01R 15/205 324/202 |
| 2013/0328548 A1 * | 12/2013 | Hackl | G01R 15/185 324/127 |
| 2014/0192450 A1 | 7/2014 | Hall | |

(Continued)

FOREIGN PATENT DOCUMENTS

| | | |
|---|---|---|
| CN | 201975250 U | 9/2011 |
| CN | 102427004 A | 4/2012 |
| CN | 102800471 A | 11/2012 |

(Continued)

*Primary Examiner* — Shawki S Ismail
*Assistant Examiner* — Kazi S Hossaini
(74) *Attorney, Agent, or Firm* — LEYDIG, VOIT & MAYER, LTD.

(57) ABSTRACT

A current controlling element includes: a first magnetic core forming a magnetic circuit; a coil for generating a magnetic flux in the first magnetic core when energized; a second magnetic core arranged at a distance from the first magnetic core; and a magnetoresistive conductor arranged in a first air gap between the first magnetic core and the second magnetic core.

17 Claims, 6 Drawing Sheets

(56) References Cited

U.S. PATENT DOCUMENTS

2018/0175286 A1* 6/2018 Sato ................ H10N 50/10

FOREIGN PATENT DOCUMENTS

| CN | 103765530 A | 4/2014 |
| CN | 104052332 A | 9/2014 |
| GB | 1169451 A | 11/1969 |

* cited by examiner

CURRENT CONTROLLING ELEMENT BASED ON SATURATION OF A MAGNETIC CIRCUIT

CROSS-REFERENCE TO PRIOR APPLICATION

Priority is claimed to British Patent Application No. GB 2013521.6, filed on Aug. 28, 2020, the entire disclosure of which is hereby incorporated by reference herein.

FIELD

The invention relates to a current controlling element, which comprises a first magnetic core forming a magnetic circuit, a coil, which is designed to generate a magnetic flux in the first magnetic core when it its energized, and a second magnetic core, which is arranged at a distance from the first magnetic core.

BACKGROUND

Current controlling elements are known in prior art in various embodiments, like as relays, transistor-switches, thyristor-switches, optocoupler-switches and so on. Some provide galvanic separation, some are contactless, some have a very steep switching characteristic and some are suitable for very high currents. However, known devices suffer from various limitations, and there is missing a very robust device for very high currents, which can provide galvanic separation which is contactless, does not require additional electronic, does not contain moving parts, has small conduction losses and which provides steep switching or current limiting characteristics.

SUMMARY

In an embodiment, the present invention provides a current controlling element, comprising: a first magnetic core forming a magnetic circuit; a coil configured to generate a magnetic flux in the first magnetic core when energized; a second magnetic core arranged at a distance from the first magnetic core; and a magnetoresistive conductor arranged in a first air gap between the first magnetic core and the second magnetic core.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
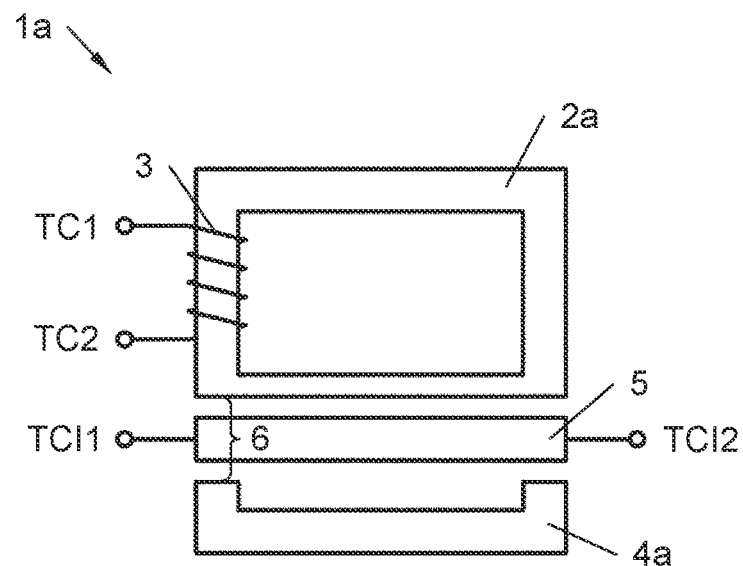
FIG. 1 shows a first example of a current controlling element with a closed first magnetic core without an air gap.

In an embodiment, the present invention provides an improved current controlling element. In particular, a current controlling element shall be provided, which overcomes the above limitations.

In an embodiment, the present invention provides an arrangement as disclosed in the opening paragraph, which additionally comprises a magnetoresistive conductor arranged in a first air gap between the first magnetic core and the second magnetic core.

The current controlling element functions as follows: When the current through the coil is increased, the magnetic flux through the first magnetic core is increased as well. At some point, the first magnetic core is saturated and an additional magnetic flux caused by an additional current through the coil flows outside the first magnetic core. The current controlling element is designed in a way that said additional flux is guided through the second magnetic core causing the magnetoresistive conductor being exposed to magnetic field as well. Accordingly, the resistance of the magnetoresistive conductor is changed and hence a current through the magnetoresistive conductor is changed. The magnetoresistive conductor (in particular its active parts, e.g. its semiconductor structure) beneficially is placed in a region of a high magnetic flux (i.e. a high concentration of flux lines).

The point or range when the first magnetic core saturates and the magnetic field emanates into the second magnetic core is chosen in a way that the current linked to this magnetic flux corresponds to a switching threshold or switching range of the current controlling element. In particular, the nominal switching current of the current controlling element is at said switching threshold.

So, generally, a "nominal switching current" Inom for a current I through the coil or a "switching threshold" can be defined. Both terms can interchangeably used throughout this disclosure. The magnetic flux mainly exists in the first magnetic core below the nominal switching current Inom or the switching threshold, and it emanates into the second magnetic core at and above the nominal switching current Inom or the switching threshold. Hence, there is a substantial traverse magnetic field through the magnetoresistive conductor above the nominal switching current Inom or above the switching threshold influencing the resistance of the magnetoresistive conductor.

The current controlling element can comprise a housing with a nominal switching current Inom for a current I through the coil or an information referring to the nominal switching current Inom printed on the housing. Such an information can be a part number or a symbol or a color associated with a particular nominal switching current Inom.

It should be noted that there is no "binary" or "digital" swap of the magnetic flux into the second magnetic core in the sense of all or nothing, but the change is continuous, but also steep depending on the design.

So, strictly speaking, it is a range where the first magnetic core saturates and the magnetic field emanates into the second magnetic core. Hence, the current controlling element is designed in a way that the current linked to this magnetic flux corresponds to a switching range of the current controlling element. In particular, the nominal switching current of the current controlling element is within said switching range.

Generally, the point or range when the first magnetic core saturates can be influenced by choosing the material and the cross section of the first magnetic core in a useful way. Lower cross sections and magnetic materials with a lower saturation flux density lead to earlier saturations and thus to a lower switching point or switching range.

Beneficially, the first magnetic core is designed in way that parts thereof, which saturate at the switching point or switching range, are arranged nearby the magnetoresistive conductor and the second magnetic core. Other parts of the first magnetic core, which saturate well above the switching point or switching range, are arranged at a greater distance from the magnetoresistive conductor and the second magnetic core. This behavior can be achieved by making the cross section of the first magnetic core smaller in a region nearby to the magnetoresistive conductor and the second magnetic core than elsewhere. Alternatively or in addition, this behavior can be achieved by using a magnetic material with a lower saturation flux density in a region nearby to the magnetoresistive conductor and the second magnetic core than elsewhere.

In particular, a cross section of a leg or a part of the first magnetic core, which is arranged nearby the magnetoresistive conductor and the second magnetic core, can be smaller than the cross section in the other legs of the first magnetic core or in other parts thereof. Alternatively or in addition, a magnetic material with a lower saturation flux density can be used for a leg or a part of the first magnetic core, which is arranged nearby the magnetoresistive conductor and the second magnetic core, and a magnetic material with a higher saturation flux density can be used in other legs or parts of the first magnetic core.

By the above measures, a current controlling element with a number of beneficial characteristics is obtained. First, a galvanic separation of the control circuit and the controlled circuit can be obtained. Second, the current controlling element is contactless. And third, there is a steep increase of the resistance of the magnetoresistive conductor when the control current reaches its switching threshold value. So, a (binary) switch on/switch off behavior can be approximated. Moreover, the disclosed current controlling element is very robust and suitable for high currents (i.e. it has a small resistance at nominal current). Hence, it qualifies well for heavy duty applications.

Generally, the first magnetic core can form a) a closed magnetic circuit without a second air gap or b) an open magnetic circuit having at least one second air gap. An air gap provides the advantage, that the current through the coil, which flows when the first magnetic core saturates, and thus the switching threshold can be controlled. The length of the second air gap preferably is chosen in a way that the first magnetic core saturates when the nominal current is reached.

In this context it is beneficial if the first magnetic core in case b) comprises a first sub part and a separate second sub part with the at least one second air gap in-between (i.e. between the first sub part and the second sub part). The second sub part is closer to the magnetoresistive conductor and the second magnetic core than the first sub part. The second sub part shall preferably saturate when the nominal current is reached, and the second sub part shall saturate after the first sub part what can be achieved by design of the length of the second air gap, design of the cross section of the first and the second sub part and/or material choice for the first and the second sub part. After the second sub part has been saturated, an additional magnetic flux is transferred into the second magnetic core. To achieve the desired function, in particular, the cross section of the second sub part can be made smaller than the cross section of the first sub part. Alternatively or in addition, magnetic material with a lower saturation flux density can be used for the second sub part, and a magnetic material with a higher saturation flux density can be used for the first sub part.

Further on, the first magnetic core in particular can form a magnetic circuit in the shape of a single ring or in the shape of multiple rings. If there is a first and a second sub part, the first sub part is shaped like an "U" in case of a single ring and shaped like an "E" or an "M" in case of a double ring magnetic circuit.

Beneficially, the resistance of the magnetoresistive conductor increases with an increase of the magnetic flux through the magnetoresistive conductor. In this way, a switch-off characteristic or current-limiting characteristic can be provided, in other words, a kind of a normally closed contact or break contact. However, in principle, the resistance of the magnetoresistive conductor may also decrease with an increase of the magnetic flux through the magnetoresistive conductor. In that way, a switch-on characteristic can be provided, in other words a kind of a normally open contact or closing contact. Generally, the resistance with no magnetic field applied is usually comparably high for the latter materials. Moreover the change of resistance for those materials usually is in the range of two orders if a comparably strong magnetic field is applied.

In a preferred embodiment of the current controlling element, the magnetoresistive conductor contacts the first magnetic core and the second magnetic core. This configuration enables good heat transfer and keeps the magnetoresistive conductor comparably cool. If there is a second sub part, the magnetoresistive conductor in particular contacts the second sub part and the second magnetic core.

Advantageously, a reluctance of the first magnetic core (alone) is at least 10 times lower than a reluctance of first magnetic core together with the second magnetic core. In this way, the magnetic flux is mainly kept within the first magnetic core up to the switching threshold.

Beneficially, the first magnetic core and/or the second magnetic core is made of Vanadium permendur. Vanadium permendur is a soft ferromagnetic alloy comprising cobalt (Co), iron (Fe) and vanadium (Va) in particular having a saturation flux of more than 2 Tesla. Generally, the material of the first magnetic core and its cross section should be designed in a way that the magnetic flux up to the switching threshold can be handled without or just low saturation. If Vanadium permendur is chosen, the cross section of the first magnetic core can be kept small. In a similar way, the second magnetic core and its cross section should be designed in a way that the magnetic flux above the switching threshold can be handled. If Vanadium permendur is chosen, the cross section of the second magnetic core can be kept small as well.

Preferably, the first sub part is made of Vanadium permendur (which has a saturation flux of around or more than 2 Tesla) and/or the second sub part is made of a Mu-metal (which is a nickel-iron soft ferromagnetic alloy and which has a saturation flux of around 1 Tesla) or of ferrite (having a saturation flux 0.5 Tesla or less). In addition, the second magnetic core can be made of Vanadium permendur, too. These materials can well support the behavior of the first magnetic core that the second sub part saturates at the nominal current and well before saturation effects occur in the first sub part.

Beneficially, the magnetoresistive conductor has a semiconductor-metal hybrid structure and operates according to the Extraordinary magnetoresistance effect. The Extraordinary magnetoresistance (EMR) is a magnetoresistance effect, which allows changes of the electrical resistance caused by the application of a magnetic field in the region of 1:10.000 and more. The effect occurs in semiconductor-metal hybrid systems when a transverse magnetic field is applied. Without a magnetic field the magnetoresistive conductor has a low-resistance. Upon application of a magnetic field the magnetoresistive conductor has a much higher electrical resistance. Accordingly, this material is suitable for the disclosed "switching" applications.

In a beneficial embodiment, the current controlling element comprises two control terminals with the coil switched in-between and two controlled current terminals with the magnetoresistive conductor switched in-between. In this way, a device is formed, by which a current in a first circuit including the magnetoresistive conductor is controlled by a current in a second circuit including the coil.

In another beneficial embodiment, the current controlling element comprises two auto current limiter terminals and a series connection of the coil and the magnetoresistive conductor switched in-between. In this way, the current in an electric circuit can be limited. Hence, the current controlling element becomes a "current limiting element" in this embodiment, e.g. a circuit breaker.

In both embodiments, it is of advantage if a resistor switched between the two controlled current terminals or between the two auto current limiter terminals. In this way, the range, in which the total resistance between the controlled current terminals or between the auto current limiter terminals varies, can be set or influenced. Moreover, without the resistor, electric energy would have to be dissipated only in magnetoresistive material what could heat it up in an undesired way and even destroy it. The resistor provides an alternative electric path for the electric (short circuit) current.

Beneficially, the current controlling element has a nominal switching current Inom for a current I through the coil, wherein
  a magnetic flux density in the first magnetic core is at least 10 times the magnetic flux density in the second magnetic core in a current range I<0.9·Inom and wherein
  the magnetic flux density in the second magnetic core is at least 0.5 times the magnetic flux density in the first magnetic core in a current range I>1.1·Inom.

By designing the first magnetic core and the second magnetic core in an appropriate way, in particular by setting air gaps accordingly and by a proper choice of cross sections and materials, the magnetic flux mainly exists in the first magnetic core below the nominal switching current Inom, and it emanates into the second magnetic core at and above the nominal switching current Inom.

Generally, same parts or similar parts are denoted with the same/similar names and reference signs. The features disclosed in the description apply to parts with the same/similar names respectively reference signs. Indicating the orientation and relative position (up, down, sideward, etc.) is related to the associated figure, and indication of the orientation and/or relative position has to be amended in different figures accordingly as the case may be.

FIG. 1 shows a first example of a current controlling element 1a in schematic side view. The current controlling element 1a comprises a first magnetic core 2a forming a magnetic circuit, a coil 3, which is designed to generate a magnetic flux in the first magnetic core 2a when it its energized, and a second magnetic core 4a, which is arranged at a distance from the first magnetic core 2a. Moreover, the current controlling element 1a comprises a magnetoresistive conductor 5 arranged in a first air gap 6 between the first magnetic core 2a and the second magnetic core 4a.

The current controlling 1a element further on has two control terminals TC1, TC2 with the coil 3 switched in-between and two controlled current terminals TCI1, TCI2 with the magnetoresistive conductor 5 switched in-between. Accordingly, a voltage between the two control terminals TC1, TC2 leads to a current through the coil 3 and in turn to a magnetic flux in the first magnetic core 2a and depending on the value of the current also in the second magnetic core 4a. In this way, the resistance between the two controlled current terminals TCI1, TCI2 is influenced or controlled what is explained in more detail by use of the FIGS. 8 to 10.

It should be noted that the first magnetic core 2a is designed in way that parts thereof, which saturate at the switching threshold, are arranged nearby the magnetoresistive conductor 5 and the second magnetic core 4a. In detail, the cross section of the lower leg of the first magnetic core 2a, which is arranged nearby the magnetoresistive conductor 5 and the second magnetic core 4a, is smaller than the cross section in the other legs. Accordingly, saturation occurs earlier in the lower leg than in the other legs. Because the lower leg of the first magnetic core 2a is arranged nearby the magnetoresistive conductor 5 and the second magnetic core 4a, an additional magnetic flux reliably emanates into the second magnetic core 4a and thereby traverses the magnetoresistive conductor 5. Alternatively or in addition, a magnetic material with a lower saturation flux density can be used for the lower leg, and magnetic material with a higher saturation flux density can be use for the other legs, which leads to earlier saturation in the lower leg as well.

Figure 2:
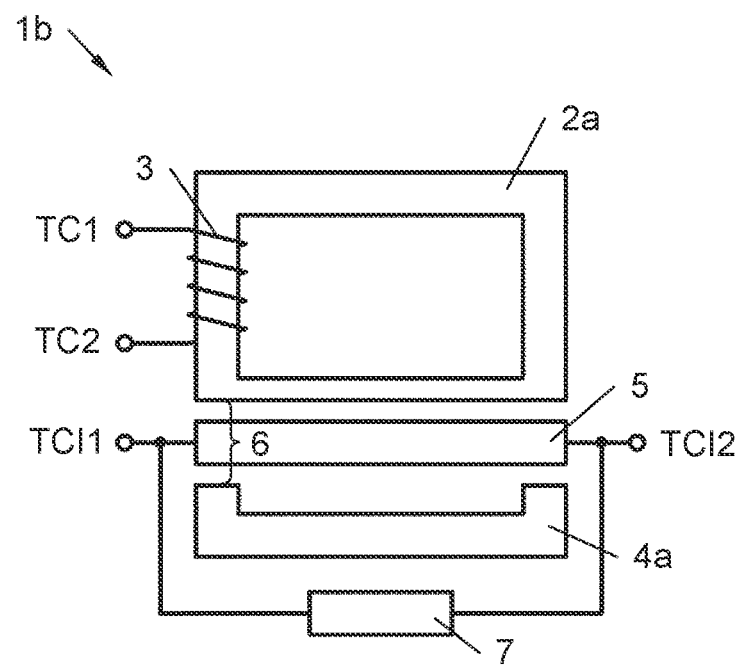
FIG. 2 shows a second example of a current controlling element with a resistor switched in parallel to the magnetoresistive conductor.

FIG. 2 shows another example of a current controlling element 1b, which is quite similar to the current controlling element 1a of FIG. 1. In contrast, a resistor 7 is switched between the two controlled current terminals TCI1, TCI2. In this way, the range, in which the total resistance between the two controlled current terminals TCI1, TCI2 varies, can be set or influenced. Moreover, the resistor 7 provides an alternative electric path for the electric (short circuit) current so that electric energy can be dissipated in the resistor 7 when the magnetoresistive conductor 5 cuts off current. Thus, undesired heat up of the magnetoresistive conductor 5 can be avoided.

Figure 3:
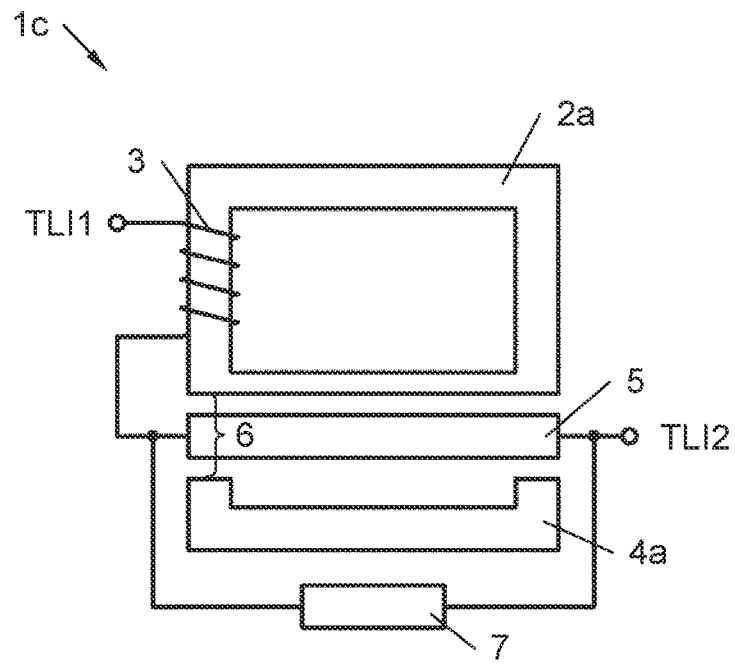
FIG. 3 shows an example of a current limiting element.

FIG. 3 shows another example of a current controlling element 1c, which is quite similar to the current controlling element 1b of FIG. 2. In contrast, the current controlling element 1c comprises two auto current limiter terminals TLI1, TLI2 and a series connection of the coil 3 and the magnetoresistive conductor 5 switched in-between. In this way, the current in an electric circuit, which the current controlling element 1c is part of, can be limited. Hence, the current controlling element 1c becomes a "current limiting element" in this embodiment, e.g. a circuit breaker. Generally, a resistor 7 may be switched in parallel with the magnetoresistive conductor 5 or not.

Figure 4:
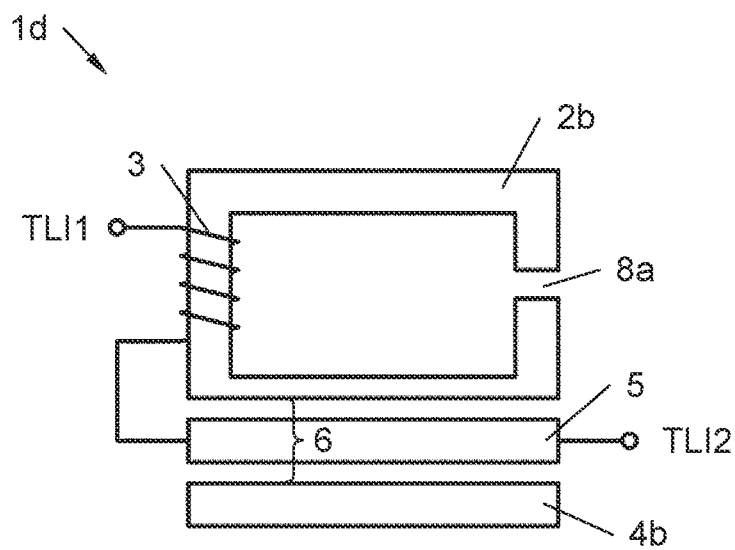
FIG. 4 shows a current limiting element with an air gap in the first magnetic core.

FIG. 4 shows another example of a current controlling element 1d, which is similar to the current controlling element 1c of FIG. 3. In contrast, there is no resistor 7, the second magnetic core 4b is shaped differently to the second magnetic core 4a (it is bar-shaped instead of U-shaped) and the first magnetic core 2b does not form a closed magnetic circuit without a second air gap (case a), but an open magnetic circuit having a second air gap 8a (case b). The second air gap 8a provides the advantage, that the current through the coil 3, which flows when the first magnetic core 2b saturates, and thus the switching threshold can be controlled. The length of the second air gap 8a preferably is chosen in a way that the first magnetic core 2b saturates when the nominal current is reached.

Figure 5:
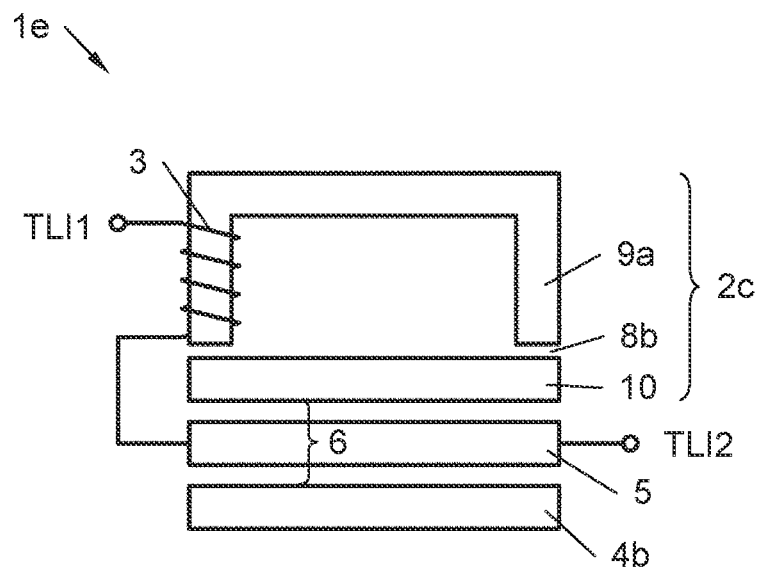
FIG. 5 shows a current limiting element with two air gaps in the first magnetic core.

FIG. 5 shows another example of a current controlling element 1e, which is similar to the current controlling element 1d of FIG. 4. In contrast, there are two second air gaps 8b, and the first magnetic core 2c comprises a first sub part 9a and a separate second sub part 10 with the second air gaps 8b in-between. This is an alternative embodiment to control when saturation of the first magnetic core 2c starts and when the switching threshold is reached. The length of the second air gaps 8b preferably is chosen in a way that the second sub part 10 saturates when the nominal current is reached. After the second sub part 10 has been saturated, an additional magnetic flux is transferred into the second magnetic core 4b. Preferably, the second sub part 10 saturates well before any saturation effects occur the first sub part 9a.

Figure 6:
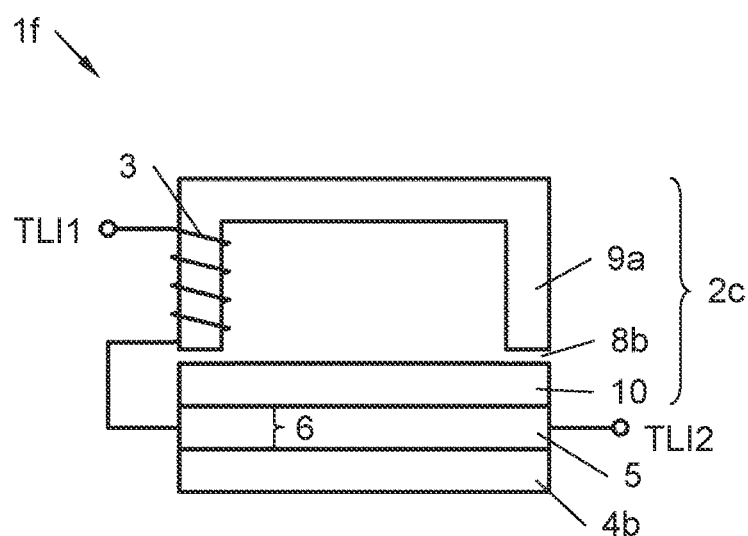
FIG. 6 shows a current limiting element, wherein the magnetoresistive conductor is in contact with the first magnetic core and the second magnetic core.

FIG. 6 shows another example of a current controlling element 1f, which is similar to the current controlling element 1e of FIG. 5. In contrast, the magnetoresistive conductor 5 contacts the first magnetic core 2c and the second magnetic core 4b, in detail the second sub part 10 and the second magnetic core 4b. This configuration enables good heat transfer and keeps the magnetoresistive conductor 5 comparably cool.

Figure 7:
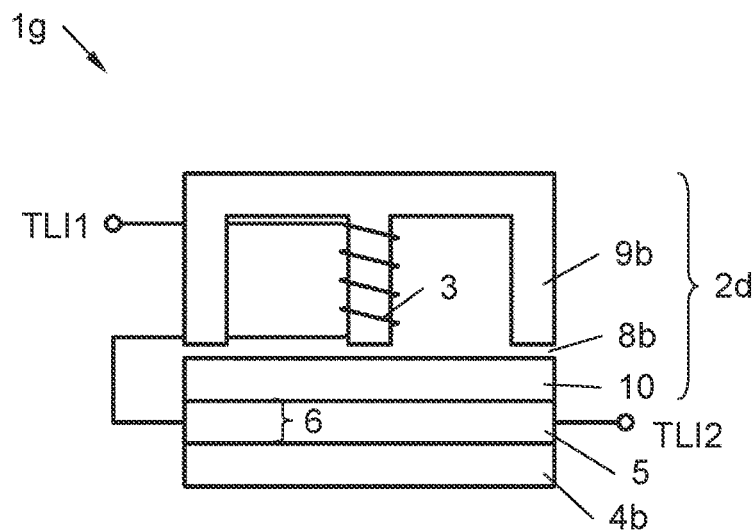
FIG. 7 shows a current limiting element with a first sub part of the first magnetic core, which is M-shaped.

FIG. 7 shows another example of a current controlling element 1g, which is similar to the current controlling element 1f of FIG. 6. In contrast, the first sub part 9b is not U-shaped, but M-shaped or E-shaped. In this way there are three areas, in which the magnetic flux traverses the magnetoresistive conductor 5, instead of two. This may contribute to vary the resistance of the magnetoresistive conductor 5 in comparison to the embodiment shown in FIGS. 1 to 6.

Figure 8:
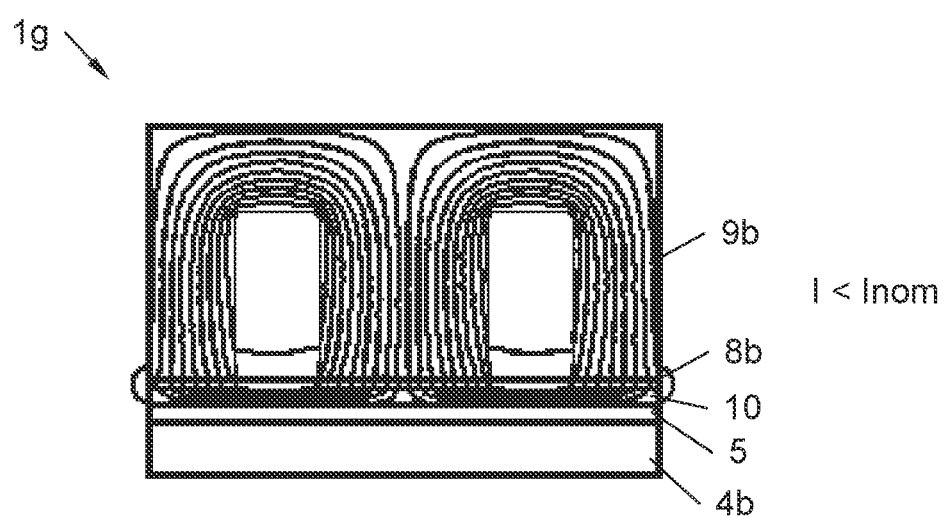
FIG. 8 shows the magnetic flux in a current controlling element in a current range below the nominal switching current.
Figure 9:
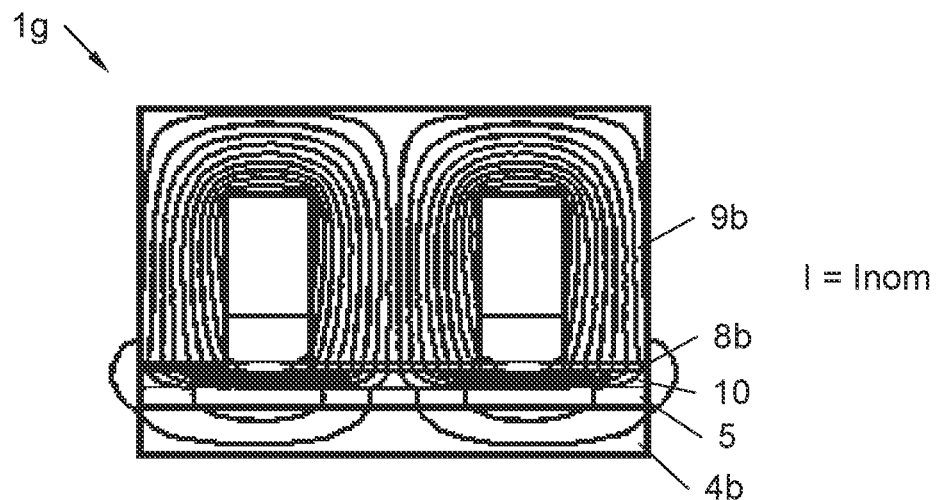
FIG. 9 shows the magnetic flux in the current controlling element of FIG. 8 at the nominal switching current.
Figure 10:
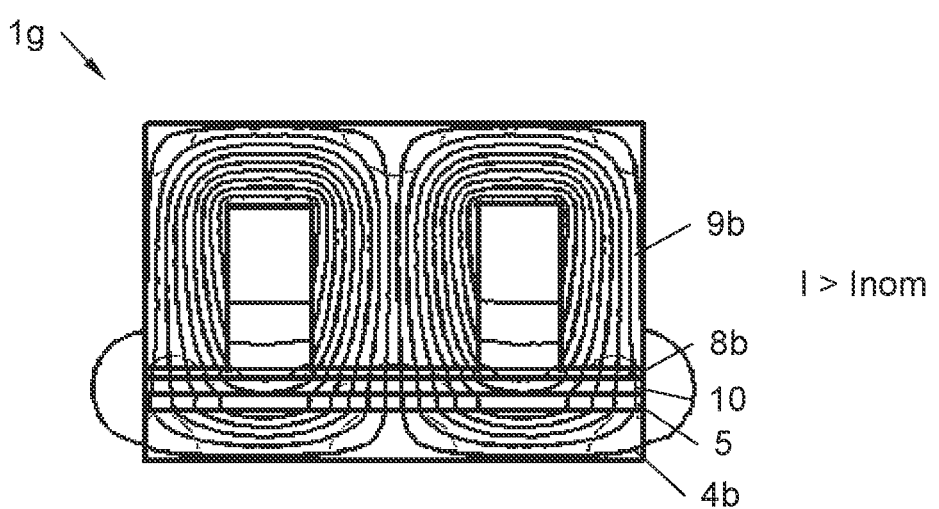
FIG. 10 shows the magnetic flux in a current controlling element in a current range above the nominal switching current.

FIGS. 8 to 10 now illustrate the function of the current controlling element 1g. FIG. 8 shows the magnetic flux in the current controlling element 1g in a current range below the nominal switching current I<Inom or below the switching threshold. As is visible, the flux lines are concentrated in the first magnetic core 9b and there is no or no substantial magnetic flux in the magnetoresistive conductor 5 and in the second magnetic core 4b.

FIG. 9 shows the magnetic flux in the current controlling element 1g at the nominal switching current I=Inom or at the switching threshold. As is visible, the flux lines are still concentrated in the first magnetic core 9b and the magnetic flux emanates into the magnetoresistive conductor 5 and into the second magnetic core 4b only to a low extent.

FIG. 10 finally shows the magnetic flux in the current controlling element 1g in a current range above the nominal switching current I>Inom or above the switching threshold. As is visible, the flux lines emanate into the magnetoresistive conductor 5 and into the second magnetic core 4b to a substantial extent. In particular, the magnetoresistive conductor 5 is traversed by a substantial number of flux lines.

It should be noted that the function illustrated in FIGS. 8 to 10 is similar to or comparable with the function of all embodiments shown in FIGS. 1 to 7. That is why the technical teaching disclosed in the context of FIGS. 8 to 10 and disclosed hereinafter is applicable to all embodiments shown in FIGS. 1 to 7.

To support or provide the behavior described above, a reluctance of the first magnetic core 2a . . . 2d (alone) preferably is at least 10 times lower than a reluctance of first magnetic core 2a . . . 2d together with the second magnetic core 4a, 4b. In this way, the magnetic flux is mainly kept within the first magnetic core 2a . . . 2d up to the nominal switching current I>Inom or up to the switching threshold.

To support or provide the above behavior,
- a magnetic flux density in the first magnetic core 2a . . . 2d preferably is at least 10 times the magnetic flux density in the second magnetic core 4a, 4b in a current range I<0.9·Inom and
- the magnetic flux density in the second magnetic core 4a, 4b preferably is at least 0.5 times the magnetic flux density in the first magnetic core 2a . . . 2d in a current range I>1.1·Inom.

By designing the first magnetic core 2a . . . 2d and the second magnetic core 4a, 4b in an appropriate way, in particular by setting air gaps 8a, 8b as well as by choosing the cross section and the material of the first magnetic core 2a . . . 2d accordingly, the magnetic flux mainly exists in the first magnetic core 2a . . . 2d below the nominal switching current Inom, and it emanates into the second magnetic core 4a, 4b at or above the nominal switching current Inom. It should be noted that there is no "binary" swap of the magnetic flux into the second magnetic core 4a, 4b in the sense of all or nothing, but the change is continuous, but also steep depending on the design as illustrated in FIGS. 1 to 10.

As noted before, the desired behavior can be achieved by choosing appropriate cross sections for the first sub part 9b and the second sub part 10. In the example of FIGS. 8 to 10 the cross section of the second sub part 10 is small compared to the cross section of the first sub part 9b. Hence, the second sub part 10 saturates well before any saturation effects occur the first sub part 9a.

Beneficially, the first magnetic core 2a . . . 2d and/or the second magnetic core 4a, 4b is/are made of Vanadium permendur. Generally, the material of the first magnetic core 2a . . . 2d and its cross section should be designed in a way that the magnetic flux up to the switching threshold can be handled. If Vanadium permendur is chosen, the cross section of the first magnetic core 2a . . . 2d can be kept small. In a similar way, the second magnetic core 4a, 4b and its cross section should be designed in a way that the magnetic flux above the switching threshold can be handled. If Vanadium permendur is chosen, the cross section of the second magnetic core 4a, 4b can be kept small as well.

Preferably, the first sub part 9a, 9b is made of Vanadium permendur and/or the second sub part 10 is made of a Mu-metal, which is a nickel-iron soft ferromagnetic alloy. In addition, the second magnetic core 4a, 4b preferably can be made of Vanadium permendur, too. The way of this material choice supports the behavior of the first magnetic core 2c, 2d that the second sub part 10 saturates at the nominal current Inom and that the second sub part 10 saturates well before any saturation effects occur the first sub part 9a, 9b.

Generally, the current controlling element 1a . . . 1f can comprise a housing with a nominal switching current Inom for a current I through the coil 3 or an information referring to the nominal switching current Inom printed on the housing. Such an information can be a part number or a symbol or a color associated with a particular nominal switching current Inom.

Beneficially, the magnetoresistive conductor 5 has a semiconductor-metal hybrid structure and operates according to the Extraordinary magnetoresistance effect. The Extraordinary magnetoresistance (EMR) is a magnetoresistance effect, which allows changes of the electrical resistance caused the application of a magnetic field in the region of 1:10.000 and more. The effect occurs in semiconductor-metal hybrid systems when a transverse magnetic field is applied. Without a magnetic field the magnetoresistive conductor 5 has a low-resistance. Upon application of a magnetic field the magnetoresistive conductor 5 has a much higher electrical resistance. Accordingly, this material is well suited for "switching" applications. In particular, a switch-off characteristic or current-limiting characteristic can be provided, in other words a kind of a normally closed contact or break contact.

However, in principle, the resistance of the magnetoresistive conductor 5 may also decrease with an increase of the magnetic flux through the magnetoresistive conductor 5. In that way, a switch-on characteristic can be provided, in other words a kind of a normally open contact or closing contact.

Figure 11:
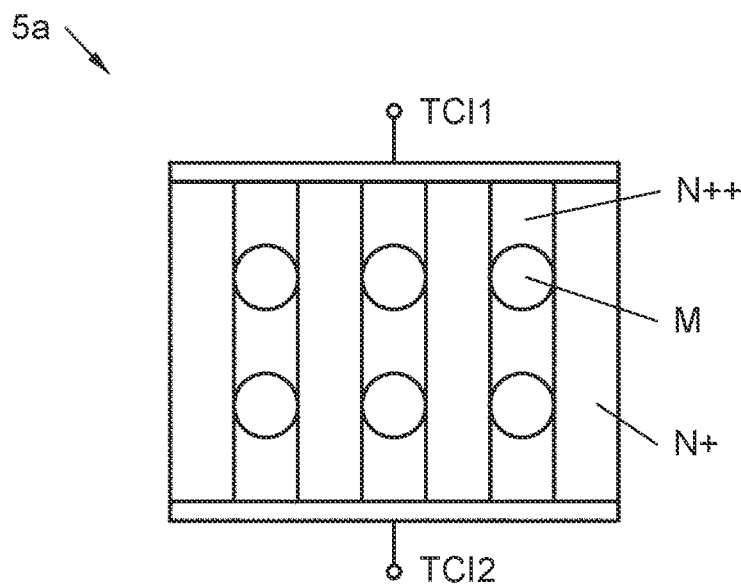
FIG. 11 shows a first exemplary structure of a magnetoresistive conductor.

FIG. 11 shows a first exemplary structure of a magnetoresistive conductor 5a in cross sectional view. Between two controlled current terminals TCI1, TCI2 (alternatively between two auto current limiter terminals TLI1, TLI2) the magnetoresistive conductor 5a, comprises alternating negative doted layers N+ and highly negative doted layers N++, wherein metal parts M are embedded in the highly negative doted layers N++.

Figure 12:
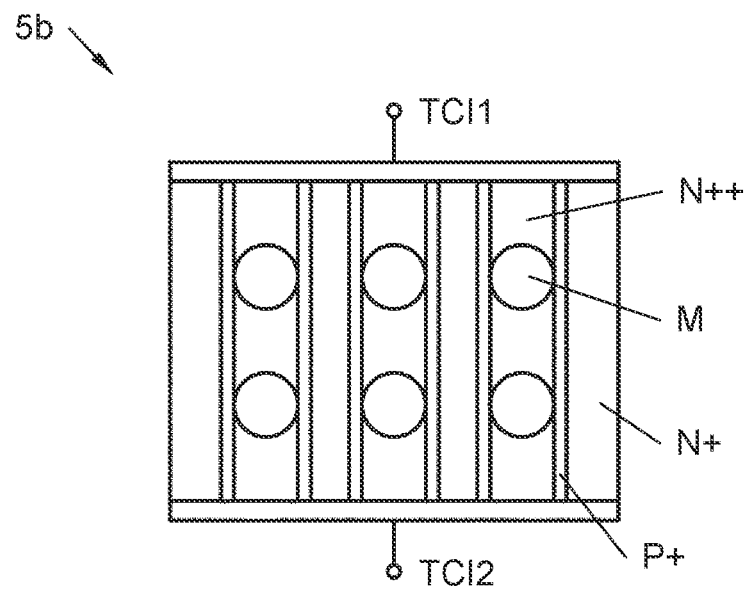
FIG. 12 shows a second exemplary structure of a magnetoresistive conductor.

In an alternative embodiment of a magnetoresistive conductor 5b, which is shown in FIG. 12, there are positive doted layers P+ between the negative doted layers N+ and highly negative doted layers N++.

It should be noted that features of one embodiment may be applied to another embodiment as the case may be. For example, the resistor 7 may be part of any one of the embodiments depicted in FIGS. 1 to 7. Further on, the current control function and the current limiting function is not linked to a particular design of the magnetic circuits, but it depends if the coil 3 and the magnetoresistive conductor 5 are switched in series or not.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1a . . . 1g current controlling element
2a . . . 2d first magnetic core
3 coil
4a, 4b second magnetic core
5, 5a, 5b magnetoresistive conductor
6 first air gap
7 resistor
8a, 8b second air gap
9a, 9b first sub part of first magnetic core
10 second sub part of first magnetic core
I current
Inom nominal current
TC1, TC2 control terminal
TCI1, TCI2 controlled current terminal
TLI1, TLI2 auto current limiter terminal
N+ negative doted layer
N++ highly negative doted layer
M metal part
P+ positive doted layer

What is claimed is:

1. A current controlling element, comprising:
a first magnetic core forming a magnetic circuit;
a coil configured to generate a magnetic flux in the first magnetic core when energized;
two control terminals with the coil switched in-between the two control terminals;
a second magnetic core arranged at a distance from the first magnetic core;
a magnetoresistive conductor arranged in a first air gap between the first magnetic core and the second magnetic core; and
two controlled current terminals with the magnetoresistive conductor switched in-between the two controlled current terminals such that a current in a second circuit comprising the magnetoresistive conductor and the two controlled current terminals is controlled by a current in a first circuit comprising the coil and the two control terminals,
wherein during operation an additional magnetic flux above saturation of the first magnetic core is guided through the second magnetic core thereby exposing the magnetoresistive conductor to a magnetic field.

2. The current controlling element of claim 1, wherein the first magnetic core forms an open magnetic circuit having at least one second air gap.

3. The current controlling element of claim 2, wherein the first magnetic core comprises a first sub part and a separate second sub part with the at least one second air gap in between.

4. The current controlling element of claim 1, wherein the magnetoresistive conductor contacts the first magnetic core and the second magnetic core.

5. The current controlling element of claim 1, wherein a reluctance of the first magnetic core is at least ten times lower than a reluctance of first magnetic core together with the second magnetic core.

6. The current controlling element of claim 1, wherein the first magnetic core and/or the second magnetic core comprise Vanadium permendur.

7. The current controlling element of claim 3, wherein the first sub part comprises Vanadium permendur and/or the second sub part comprises a Mu-metal comprising a nickel-iron soft ferromagnetic alloy.

8. The current controlling element of claim 1, wherein a resistance of the magnetoresistive conductor increases with an increase of a magnetic flux through the magnetoresistive conductor.

9. The current controlling element of claim 1, wherein the magnetoresistive conductor has a semiconductor-metal hybrid structure and operates according to an Extraordinary magnetoresistance effect.

10. The current controlling element of claim 1, further comprising:
a resistor switched between the two controlled current terminals.

11. A current controlling element, comprising:
a first magnetic core forming a magnetic circuit;
a coil configured to generate a magnetic flux in the first magnetic core when energized;
a second magnetic core arranged at a distance from the first magnetic core; and
a magnetoresistive conductor arranged in a first air gap between the first magnetic core and the second magnetic core
wherein the current controlling element is configured to have a nominal switching current Inom for a current I through the coil,
wherein a magnetic flux density in the first magnetic core is at least ten times a magnetic flux density in the second magnetic core in a current range $I<0.9 \cdot Inom$, and
wherein the magnetic flux density in the second magnetic core is at least 0.5 times the magnetic flux density in the first magnetic core in a current range $I>1.1 \cdot Inom$.

12. The current controlling element of claim 11, further comprising:
a housing with the nominal switching current Inom for the current I through the coil, or
an information referring to the nominal switching current Inom printed on the housing.

13. The current controlling element of claim 1, wherein the first magnetic core forms a closed magnetic circuit without a second air gap.

14. The current controlling element of claim 1, wherein a cross section of portions of the first magnetic core closest to the magnetoresistive conductor and the second magnetic core is smaller than the cross section of other portions of the first magnetic core, and/or
wherein a saturation flux density of the portions of the first magnetic core closest to the magnetoresistive conductor and the second magnetic core is lower than the saturation flux density of the other portions of the first magnetic core.

15. The current controlling element of claim 1, further comprising:
a nominal switching current Inom for a current I through the coil, wherein a magnetic flux density in the first magnetic core is at least ten times a magnetic flux density in the second magnetic core in a current range $I<0.9 \cdot Inom$.

16. The current controlling element of claim 1, wherein the second magnetic core comprises a first protruding leg at a first end and a second protruding leg at a second leg, the first and second ends being opposite one another and the first and second protruding legs each protruding towards the first magnetic core and the magnetoresistive conductor.

17. A method for controlling an output current, comprising:
providing a first magnetic core forming a magnetic circuit, a coil configured to generate a magnetic flux in the first magnetic core when energized, two control terminals with the coil switched in-between the two control terminals, a second magnetic core arranged at a distance form the first magnetic core, and a magnetoresistive conductor;
arranging the magnetoresistive conductor in a first air gap between the first magnetic core and the second magnetic core;
arranging a first and second controlled current terminal on the magnetoresistive conductor with the magnetoresistive conductor switched in-between the two controlled current terminals;
energizing the coil with an input current to generate a magnetic flux in the first magnetic core; and
controlling an output current between the first and second controlled current terminals on the magnetoresistive conductor by controlling the input current to the coil,
wherein during operations an additional magnetic flux above saturation of the first magnetic core is guided through the second magnetic core thereby exposing the magnetoresistive conductor to a magnetic field.

* * * * *